US010274074B1

(12) United States Patent
Alexiou et al.

(10) Patent No.: US 10,274,074 B1
(45) Date of Patent: Apr. 30, 2019

(54) TRANSFER CASE HAVING A LUBRICATION GUIDE

(71) Applicant: BorgWarner Inc., Aurburn Hills, MI (US)

(72) Inventors: Arie Alexiou, Pontiac, MI (US); Jason P. Eldred, Swartz Creek, MI (US); Ian D. Worcester, Royal Oak, MI (US); Gurmeet Singh Bedi, Rochester Hills, MI (US)

(73) Assignee: BorgWarner Inc., Auburn Hills, MI (US)

( * ) Notice: Subject to any disclaimer, the term of this patent is extended or adjusted under 35 U.S.C. 154(b) by 0 days.

(21) Appl. No.: 16/036,254

(22) Filed: Jul. 16, 2018

(51) Int. Cl.
*B60K 17/344* (2006.01)
*F16H 57/04* (2010.01)

(52) U.S. Cl.
CPC ....... *F16H 57/0428* (2013.01); *B60K 17/344* (2013.01); *F16H 57/045* (2013.01); *F16H 57/0409* (2013.01); *F16H 57/0457* (2013.01); *F16H 57/0473* (2013.01)

(58) Field of Classification Search
CPC ............... F16H 57/042; F16H 57/0427; F16H 57/0428; F16H 57/043; F16H 57/0457; F16H 57/045; F16H 57/0473; F16H 57/0409; B60K 17/344; B60K 17/3462
See application file for complete search history.

(56) References Cited

U.S. PATENT DOCUMENTS

| | | | |
|---|---|---|---|
| 3,601,515 | A | 8/1971 | Pelizzoni |
| 4,446,953 | A | 5/1984 | Voss et al. |
| 4,629,050 | A | 12/1986 | Valier |
| 4,841,803 | A | 6/1989 | Hamano et al. |
| 4,914,968 | A | 4/1990 | Diermeier et al. |
| 5,467,843 | A | 11/1995 | Esch et al. |
| 5,720,372 | A | 2/1998 | Shino et al. |
| 6,189,669 | B1 | 2/2001 | Kremer et al. |
| 6,401,896 | B1 | 6/2002 | Schnepf |
| 6,779,642 | B2 | 8/2004 | Arai et al. |
| 7,753,173 | B2 | 7/2010 | Gratzer et al. |
| 7,841,449 | B2 | 11/2010 | Nakamura et al. |
| 7,984,791 | B2 | 7/2011 | Taguchi et al. |
| 8,316,738 | B2 | 11/2012 | Hellinger et al. |
| 9,423,017 | B1 | 8/2016 | Francis et al. |
| 9,506,504 | B2 | 11/2016 | Francis et al. |
| 9,752,671 | B2 | 9/2017 | Kampe et al. |
| 9,925,868 | B2 | 3/2018 | Palazzolo et al. |
| 2004/0159520 | A1 | 8/2004 | Anwar et al. |
| 2005/0034927 | A1 | 2/2005 | Hong |
| 2005/0202920 | A1 | 9/2005 | Kelley |
| 2006/0100053 | A1 | 5/2006 | Asahi et al. |
| 2010/0065395 | A1 | 3/2010 | Baer et al. |
| 2010/0122887 | A1 | 5/2010 | Pritchard et al. |

(Continued)

*Primary Examiner* — Jacob S. Scott
*Assistant Examiner* — Lori Wu
(74) *Attorney, Agent, or Firm* — Harness, Dickey & Pierce, PLC

(57) ABSTRACT

A transfer case having a lubrication guide with an inlet, an outlet and an elongated tubular portion that is disposed between the inlet and the outlet. The lubrication guide is coupled to a drive assembly that transmits rotary power between a pair of output shafts such that the inlet is disposed proximate a first rotary component of the drive assembly to receive splash lubrication (i.e., slung lubrication and/or surge lubrication) therefrom.

15 Claims, 8 Drawing Sheets

(56) References Cited

U.S. PATENT DOCUMENTS

| | | | |
|---|---|---|---|
| 2010/0180721 A1* | 7/2010 | Quehenberger | F16H 57/0419 |
| | | | 74/606 R |
| 2015/0275993 A1 | 10/2015 | Elsesser | |
| 2015/0337948 A1* | 11/2015 | Leitgeb | F16H 57/0471 |
| | | | 74/665 GE |
| 2018/0264939 A1* | 9/2018 | Ryman | B60K 17/344 |

* cited by examiner

TRANSFER CASE HAVING A LUBRICATION GUIDE

FIELD

The present disclosure relates to a transfer case having a lubrication guide.

BACKGROUND

This section provides background information related to the present disclosure which is not necessarily prior art.

Transfer cases commonly include a mode clutch, which permits operation of the transfer case in two-wheel and four-wheel drive modes, and a two-speed gear reduction that can be employed to selectively operate the transfer case in high and low-speed ranges. With this level of complexity, the lubrication of the various mechanisms in the transfer case is important to permit the transfer case to reduce wear and exceed targeted criteria for noise, vibration and longevity. Consequently, many transfer cases employ a pump to provide a pressurized supply of lubricating fluid to the various components of the transfer case. One drawback of this approach, however, is the additional cost, complexity and weight that is associated with the pump.

Sling lubrication is a technique that is utilized in some driveline components to eliminate the need for a pump. We have found that the known sling lubrication techniques are not entirely satisfactory in situations where the transfer case is equipped with components such as a multi-plate friction clutch that have components with relatively complex physical configurations and which require a steady supply of lubrication for the lubrication of internal components (e.g., the interleaved clutch plates) at times during the operation of the transfer case.

SUMMARY

This section provides a general summary of the disclosure, and is not a comprehensive disclosure of its full scope or all of its features.

In one form, the present disclosure provides a transfer case having a housing, first and second output shafts, a drive assembly, and a lubrication guide. The housing defines an internal cavity. The first output shaft is received in the internal cavity and is supported by the housing for rotation about a primary axis. The second output shaft is received in the internal cavity and is supported by the housing for rotation about a secondary axis. The drive assembly transmits rotary power between the first and second output shafts. The lubrication guide is disposed in the internal cavity and has an inlet, an outlet and an elongated tubular section disposed between the inlet and the outlet. The lubrication guide is coupled to the drive assembly such that the inlet is disposed proximate a first rotary component of the drive assembly to receive splash lubrication therefrom when rotary power is transmitted between the first and second output shafts to drive the second output shaft in a predetermined rotational direction and at a speed in excess of a predetermined rotational speed. The inlet is disposed closer to the second output shaft than the outlet. The outlet is vertically below the inlet when the transfer case is disposed in a baseline operating position.

In another form, the present teachings provide a transfer case that includes a housing, a shaft, a clutch, a clutch actuator and a lubrication guide. The housing defines an internal cavity. The shaft is disposed in the internal cavity and is supported by the housing for rotation about a primary axis. The clutch is received in the housing and has a clutch hub, which is coupled to the shaft for rotation therewith, a clutch basket, a plurality of first clutch plates, a plurality of second clutch plates, and a pressure plate. The first clutch plates are axially slidably but non-rotatably mounted to the clutch hub. The second clutch plates are axially slidably but non-rotatably mounted to the clutch basket. The pressure plate is non-rotatably but axially slidably mounted to one of the clutch hub and the clutch basket. The clutch actuator has a rotatable ball-ramp ring that is disposed about the shaft, a non-rotatable ball-ramp ring that is disposed about the shaft, and a plurality of balls between the rotatable and non-rotatable ball-ramp rings. The lubrication guide is disposed in the internal cavity and mounted to the non-rotatable ball-ramp ring. The lubrication guide has an inlet, an outlet and an elongated tubular section disposed between the inlet and the outlet. The lubrication guide is coupled to the clutch actuator such that the inlet is positioned to receive splash lubrication when rotary power is transmitted through the clutch in a predetermined rotational direction and at a speed in excess of a predetermined rotational speed.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
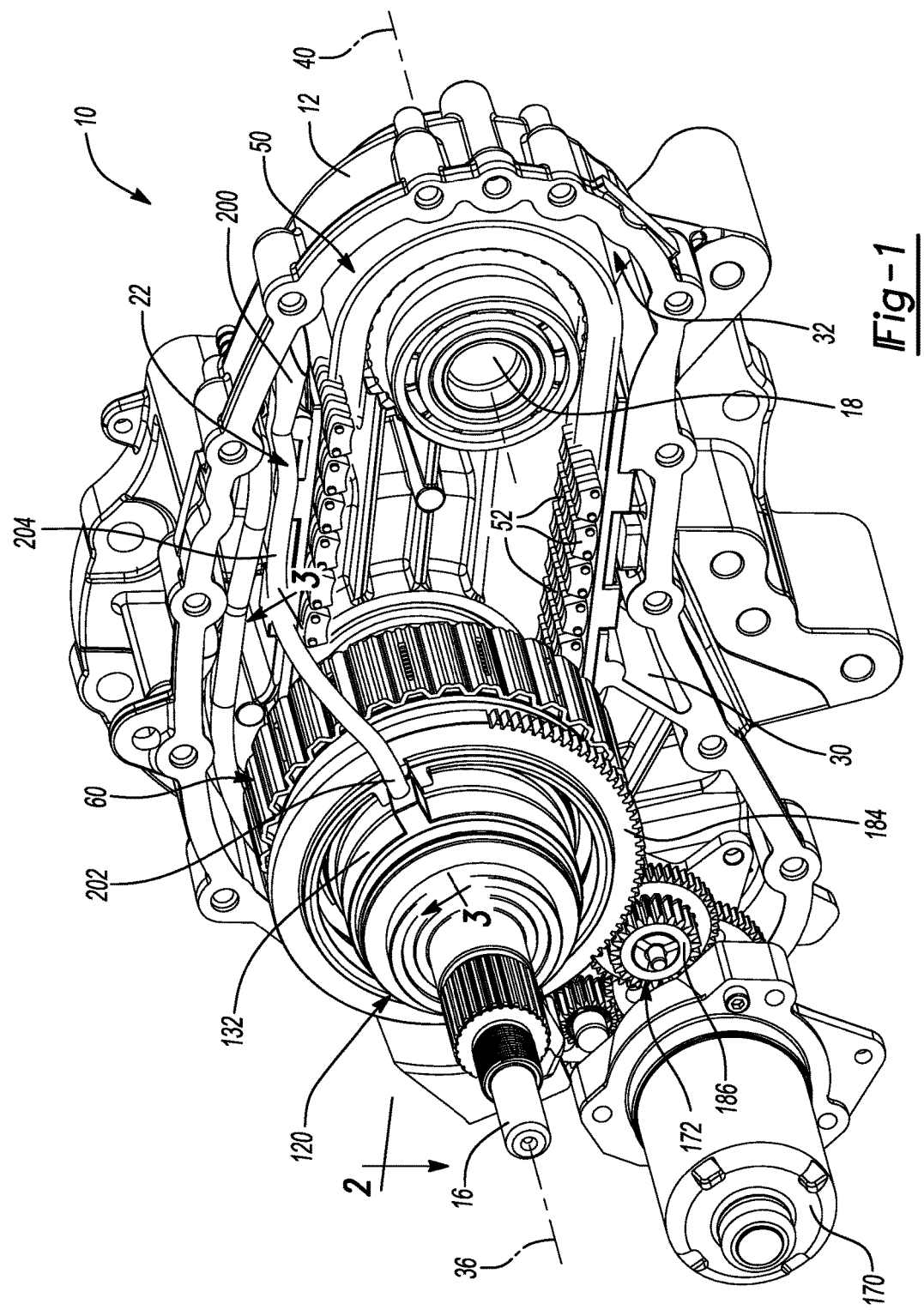
FIG. 1 is a rear perspective view of a portion of a transfer case constructed in accordance with the teachings of the present disclosure, the transfer case being depicted without a rear housing half for clarity of the discussion.
Figure 2:
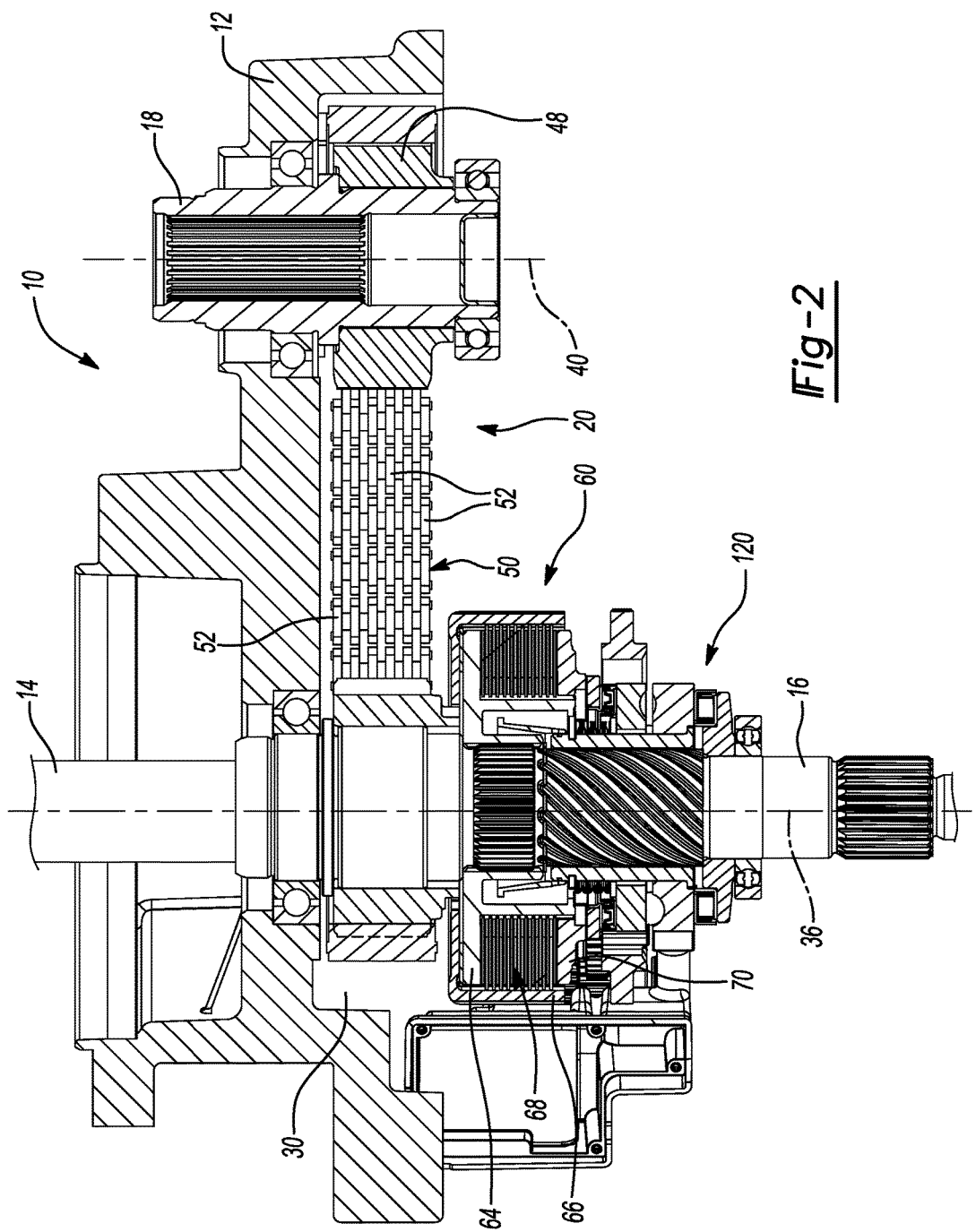
FIG. 2 is a section view taken along the line 2-2 of FIG. 1.

With reference to FIGS. 1 and 2 of the drawings, an exemplary transfer case constructed in accordance with the teachings of the present disclosure is generally indicated by reference numeral 10. The transfer case 10 can include a housing 12, an input shaft 14, a first output shaft 16, a second output shaft 18, a drive assembly 20 and a lubrication guide 22. The housing 12 can be formed in halves (only one is shown) that can cooperate to define an internal cavity 30 having a sump 32 formed therein. The sump 32 is configured to hold a suitable lubricant, such as an automatic transmission fluid. The input shaft 14 can extend into the internal cavity 30 and can be supported by the housing 12 for rotation about a primary axis 36. The first output shaft 16 can be received in the internal cavity 30 and can be supported by the housing 12 for rotation about the primary axis 36. Optionally, a transmission (not shown) can be disposed between the input shaft 14 and the first output shaft 16 to provide one or more gear reduction ratios between the input shaft 14 and the first output shaft 16. For example, the transmission 38 can be a two-speed transmission that can be selectively operated in two different gear reduction ratios. The second output shaft 18 can be received in the internal cavity 30 and can be supported by the housing 12 for rotation about a secondary axis 40 that can be spaced apart from the primary axis 36. The primary and secondary axes 36 and 40 can be parallel to one another.

The drive assembly 20 can comprise any means for transmitting rotary power between the first output shaft 16 and the second output shaft 18. The drive assembly 20 could comprise a gear train for transmitting rotary power between the first and second output shafts 16 and 18, but in the particular example provided, the drive assembly 20 include a first sprocket 44, which is driven by the first output shaft 16, a second sprocket 48, which is coupled to the second output shaft 18 for rotation therewith, and a chain 50 that is formed of a plurality of links 52 and is disposed about and engaged to the first and second sprockets 44 and 48. In situations where the second output shaft 18 is to be driven on a continuous basis, the first sprocket 44 can be coupled to the first output shaft 16 for rotation therewith. In the particular example provided, a clutch 60 is disposed between the first output shaft 16 and the first sprocket 44. The clutch 60 can be any type of clutch, such as a dog clutch or a type of clutch that employs a toothed sliding collar to rotatably couple a pair of toothed elements that are coupled to the first output shaft 16 and the first sprocket 44. In the example provided, the clutch 60 is a friction clutch having a clutch hub 64, an outer clutch basket 66, a clutch pack 68, and a pressure plate 70.

Figure 3:
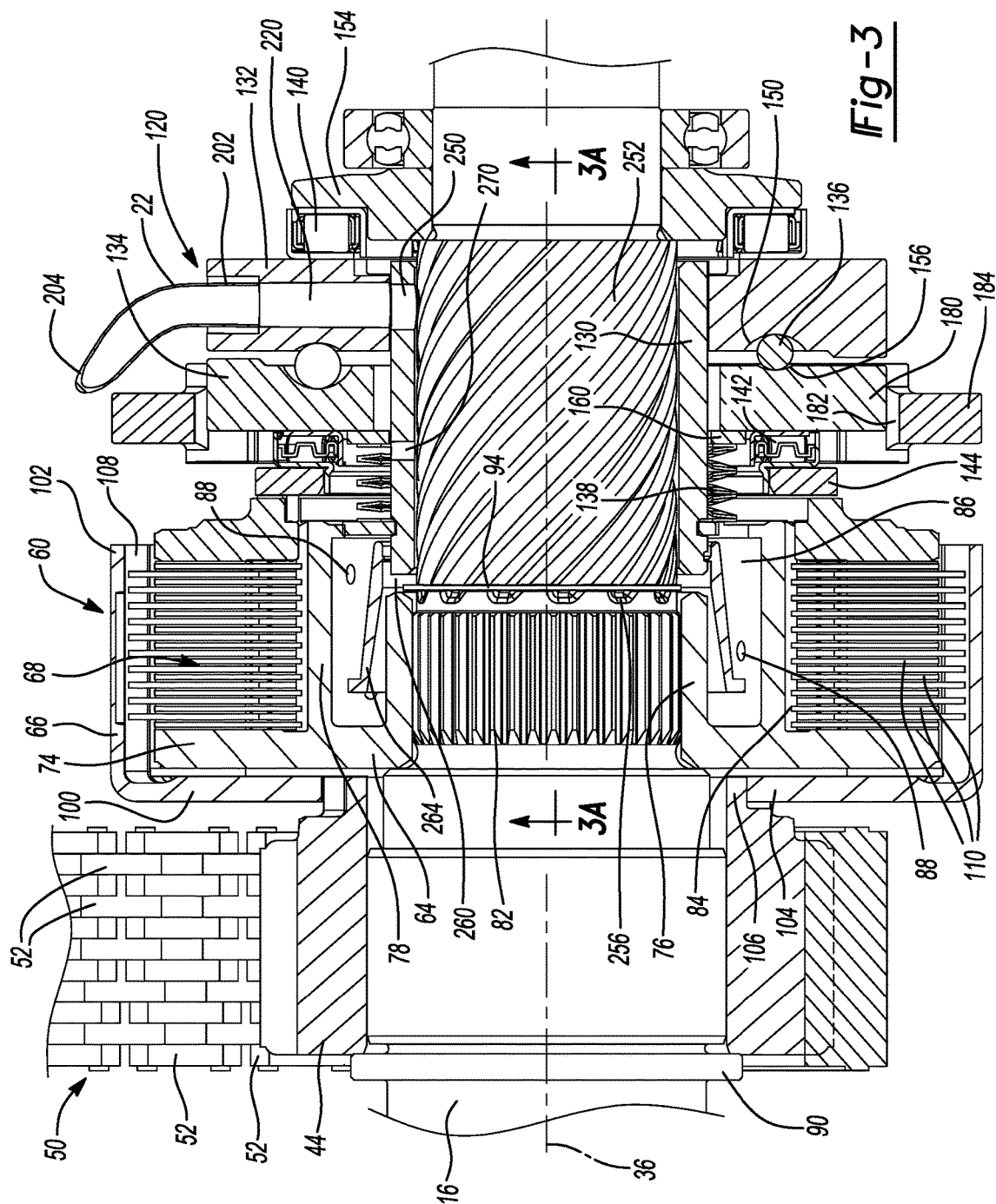
FIG. 3 is a section view taken along the line 3-3 of FIG. 1.
Figure 3A:
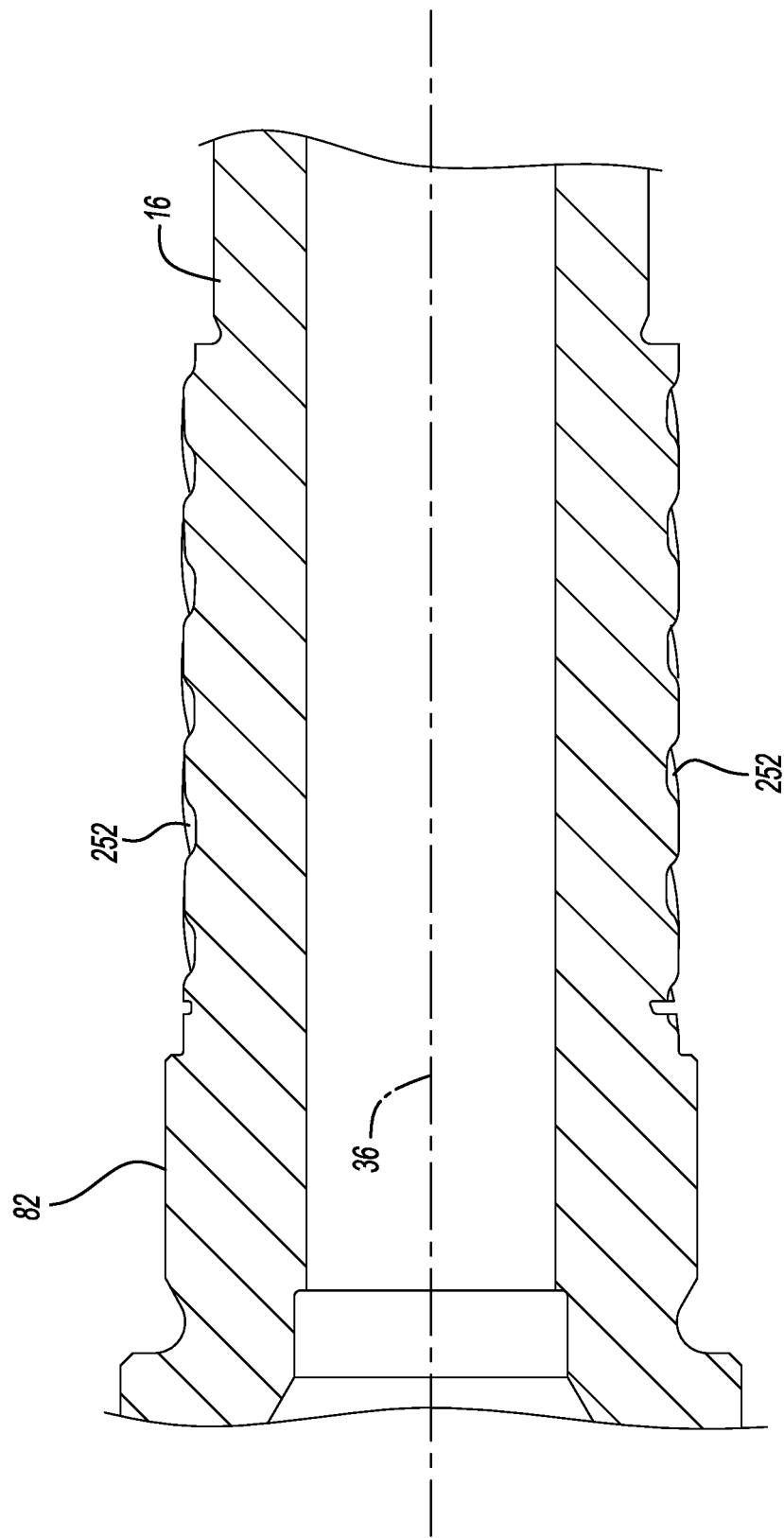
FIG. 3A is a section view taken along the line 3A-3A of FIG. 3.

With reference to FIG. 3, the clutch hub 64 can be coupled to the first output shaft 16 for rotation therewith. In the example provided, the clutch hub 64 can define a radially extending wall member 74, an internally splined hub portion 76 and a plate mount 78. The internally splined hub portion 76 can extend axially from the radially extending wall member 74 and can define an internally splined aperture 80 that can be received on a male-splined segment 82 of the first output shaft 16 to thereby non-rotatably couple the clutch hub 64 to the first output shaft 16. The plate mount 78 extends axially away from the radially extending wall member 74 and defines a male-splined mount 84. The plate mount 78 is spaced radially apart from the internally splined hub portion 76 to define an annular chamber 86 there between. One end of the annular chamber 86 is closed by the radially extending wall member 74 and the opposite end of the annular chamber 86 is open. A plurality of lubrication apertures 88 can be formed through the plate mount 78 and can intersect the annular chamber 86. The clutch hub 64 can abut a shoulder 90 formed on the first output shaft 16 and an external snap ring 94 can be secured to the first output shaft 16 to limit movement of the clutch hub 64 along the primary axis 36 in a direction away from the shoulder 90.

The outer clutch basket 66 can be coupled to the first sprocket 44 for rotation therewith. In the example provided, the outer clutch basket 66 comprises a radially extending wall 100 and an annular plate mount 102 that extends from the radially extending wall 100 along the primary axis 36. The radially extending wall 100 can define a plurality of teeth 104 that can engage corresponding teeth 106 formed on the first sprocket 44 to rotatably couple the outer clutch basket 66 to the first sprocket 44. The annular plate mount 102 defines a plurality of female spline teeth 108.

The clutch pack 68 includes a plurality of first clutch plates 110 and a plurality of second clutch plates 112 that are interleaved with the first clutch plates 110. The first clutch plates 110 define a female splined aperture that is received onto the male-splined mount 84 of the plate mount 78 on the clutch hub 64. As such, the first clutch plates 110 are non-rotatably but axially slidably mounted on the clutch hub 64. The second clutch plates 112 have a male-splined circumference and are received into and engage the female spline teeth 108 of the annular plate mount 102 on the outer clutch basket 66. As such, the second clutch plates 112 are non-rotatably but axially slidably mounted in the outer clutch basket 66. A first axial end of the clutch pack 68 can abut the radially extending wall member 74 of the clutch hub 64. The pressure plate 70 can be abutted against a second, opposite axial end of the clutch pack 68 and can be non-rotatably but axially slidably engaged to one of the clutch hub 64 and the outer clutch basket 66. In the example provided, the pressure plate 70 defines an internally splined aperture that is received onto and in engagement with the male-splined mount 84 of the plate mount 78 on the clutch hub 64.

A clutch actuator 120 can be employed to selectively operate the clutch 60. In the example provided, the clutch actuator 120 comprises a type of ball-ramp actuator having a sleeve 130, a non-rotatable ball-ramp ring 132, a rotatable ball-ramp ring 134, a plurality of balls 136, a spring 138, a first thrust bearing 140, a second thrust bearing 142 and an apply plate 144. The sleeve 130 can be received on the first output shaft 16 proximate the male splined segment 82. The non-rotatable ball-ramp ring 132 can be fixedly coupled to the sleeve 130 and can define a plurality of first ball-ramp grooves 150. The first thrust bearing 140 can be disposed on the first output shaft 16 axially between the non-rotatable ball-ramp ring 132 and a shoulder 154 that is fixedly coupled to the first output shaft 16. The rotatable ball-ramp ring 134 is disposed about the sleeve 130 and defines a plurality of second ball-ramp grooves 156. The balls 136 are disposed between the non-rotatable and rotatable ball-ramp rings 132 and 134 and are each received into a respective pair of the first and second ball ramp grooves 150 and 156. The second thrust bearing 142 is abutted to the rotatable ball-ramp ring 134 on a side that is opposite the balls 136. The apply plate 144 which is a washer-line structure, is disposed about the sleeve 130 and abuts the second thrust bearing 142 and the pressure plate 70. The spring 138 can be received coaxially about the sleeve and can exert a force that urges the rotatable ball-ramp ring 134 toward the non-rotatable ball-ramp ring 132. The spring 138 can be received between an external snap ring 94, which can be received on and engage the sleeve 130, and a washer or annular spacer 160 that can be disposed radially inward of the second thrust bearing 142 and can axially abut the rotatable ball-ramp ring 134.

It will be appreciated that the depth of each of the first and second ball-ramp grooves 150 and 156 varies in the circumferential direction (i.e., about the primary axis 36) in a conventional and well known manner so that rotation of the rotatable ball-ramp ring 134 relative to the non-rotatable ball-ramp ring 132 causes the rotatable ball-ramp ring 134 to translate along the primary axis 36.

With additional reference to FIG. 1, any means can be employed to rotate the rotatable ball-ramp ring 134. In the example provided, the rotatable ball-ramp ring 134 is driven by an electric motor 170 through a reduction drive 172. More specifically, the rotatable ball-ramp ring 134 has a male splined teeth 180 that are received into female splined teeth 182 in a sector gear 184 that is meshingly engaged to an output spur gear 186 of the reduction drive 172. Configuration in this manner permits the rotatable ball-ramp ring 134 to translate relative to the sector gear 184 when the sector gear 184 rotates the rotatable ball-ramp ring 134.

Figure 4:
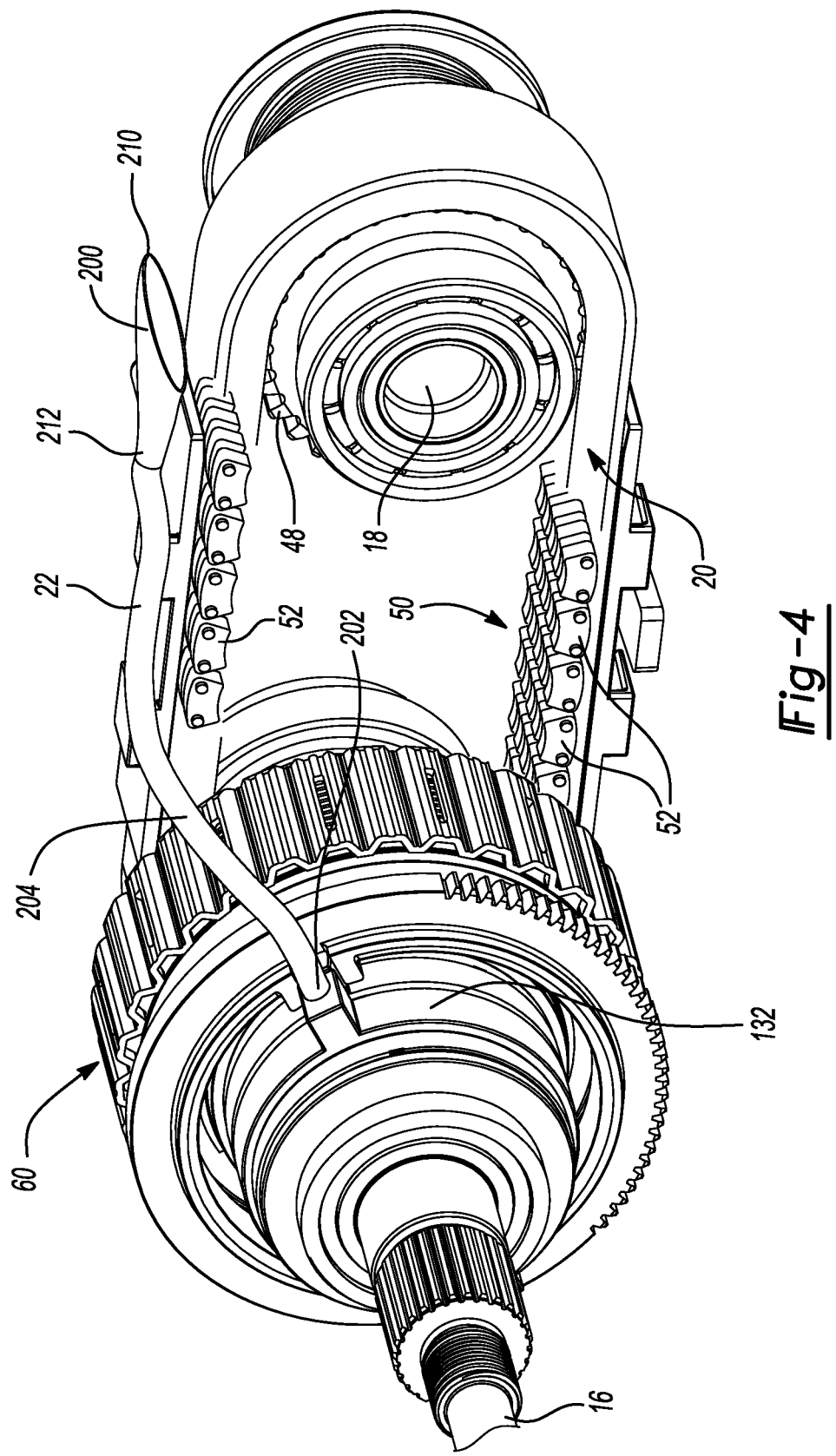
FIG. 4 is a rear perspective view of a portion of the transfer case of FIG. 1 illustrating first and second output shafts, a drive assembly and a lubrication guide in more detail.
Figure 5:
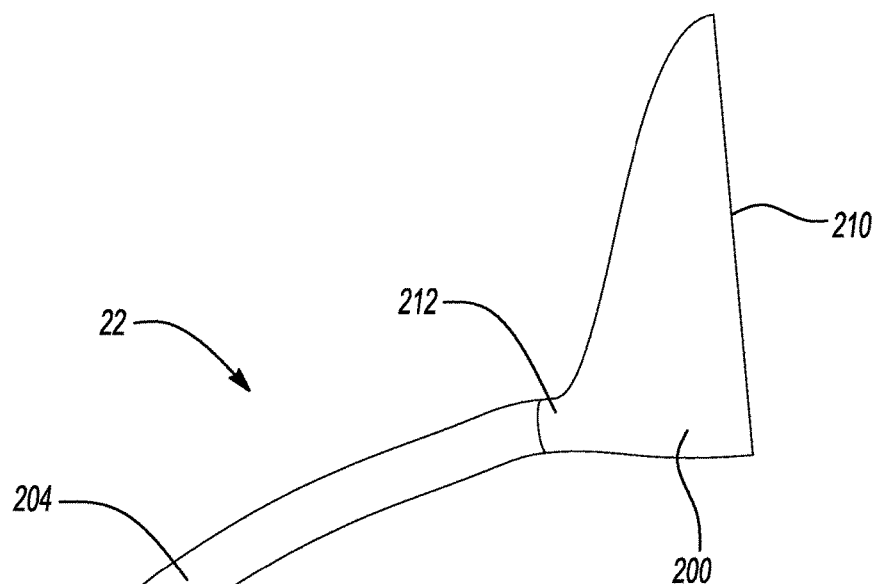
FIG. 5 is a top plan view of the lubrication guide.
Figure 6:
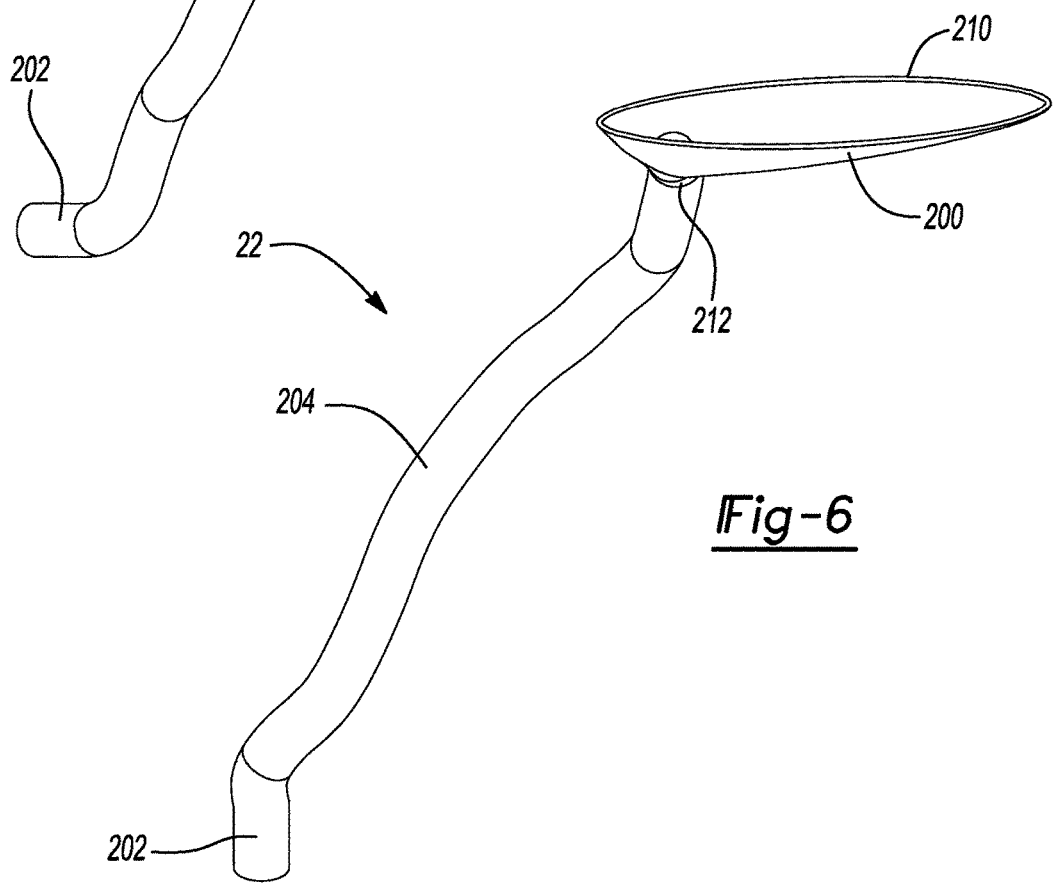
FIG. 6 is a front elevation view of the lubrication guide.
Figure 7:
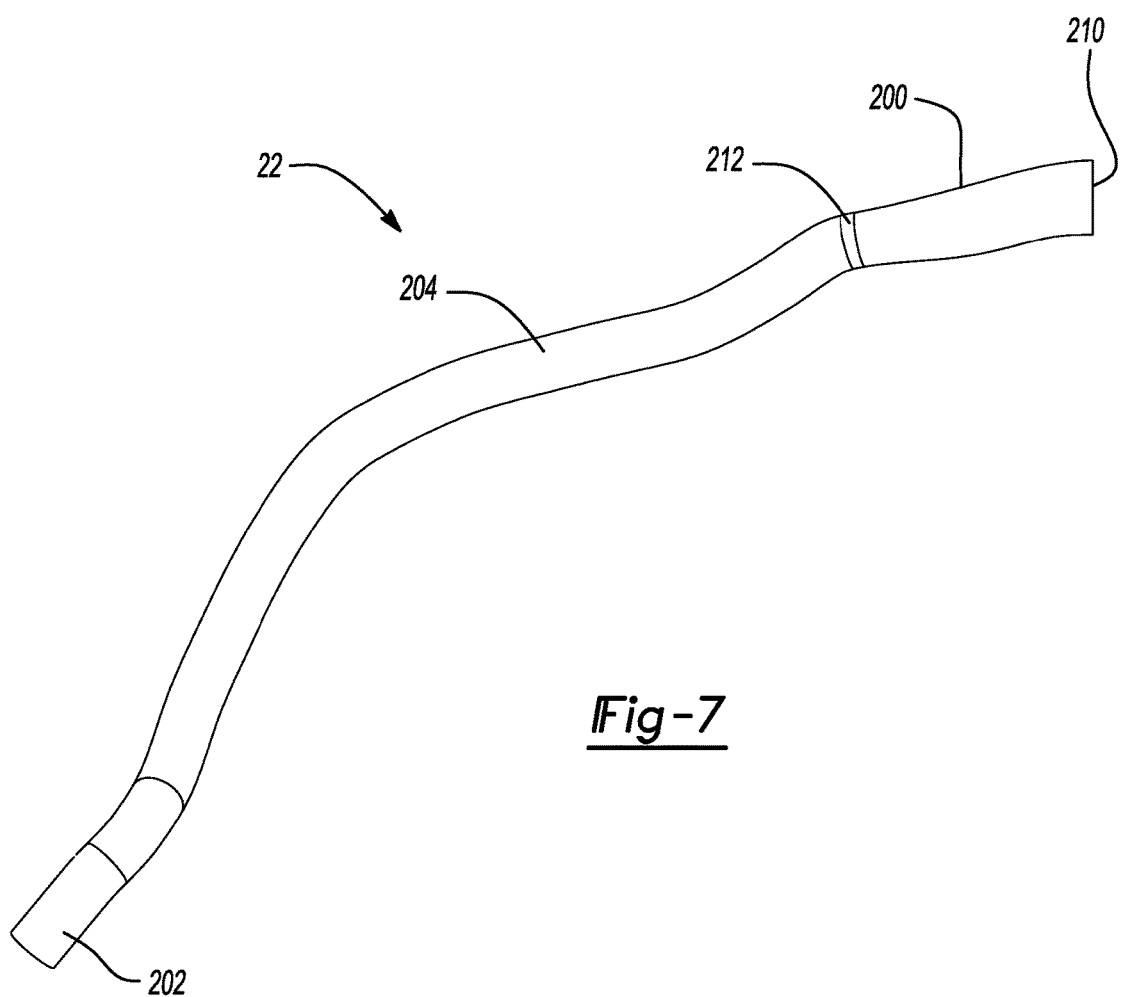
FIG. 7 is a side elevation view of the lubrication guide.

With reference to FIGS. 1 and 4, the lubrication guide 22 is received in the internal cavity 30 and as will be discussed in greater detail below, is configured to collect lubrication slung from various internal components of the transfer case 10 and transport the collected lubrication to a desired area within the internal cavity 30 when the transfer case 10 is operated throughout a predetermined range of operating positions that are associated with predetermined limits for pitch and roll of a vehicle that is equipped with the transfer case 10. The predetermined range of operating positions includes a baseline operation position, which is the orientation of the transfer case 10 when the vehicle that includes the transfer case 10 is operated on flat, level ground. The lubrication guide 22 can be coupled to one or more components of the transfer case 10 that remain in a stationary condition (relative to the housing 12) during the operation of the transfer case, such as the non-rotatable ball-ramp ring 132. It will be appreciated, however, that the lubrication guide 22 could be additionally or alternatively fixedly coupled to another structure, such as the housing 12. The lubrication guide 22 can include an inlet 200, an outlet 202 and an elongated tubular section 204 that is disposed between the inlet 200 and the outlet 202. The inlet 200 can be configured to collect and direct the collected lubrication into the elongated tubular section 204. In the example provided, the inlet 200 is disposed closer to the second output shaft 18 than the outlet 202.

With reference to FIGS. 3 and 5 through 7, the inlet 200 is funnel-shaped so that it converges between a first, open end 210 and a second end 212 that is directly connected to the elongated tubular section 204. It will be appreciated, however, that the inlet 200 could be formed as a trough that could optionally taper from the first end 210 to the second end 212. The outlet 202 is configured to dispense lubrication to a desired location within the internal cavity 30 (FIG. 1). In the example provided, the outlet 202 is fixedly coupled to the non-rotatable ball-ramp ring 132 and dispenses lubrication into a lubrication intake 220 formed radially thorough the non-rotatable ball-ramp ring 132. The elongated tubular section 204 can slope in a vertical direction from the inlet 200 to the outlet 202 when the transfer case 10 (FIG. 1) is in the baseline operating position, and can be contoured as desired to position the inlet 200 and the outlet 202 as desired and to clear various components in the internal cavity 30 (FIG. 1).

Figure 8:
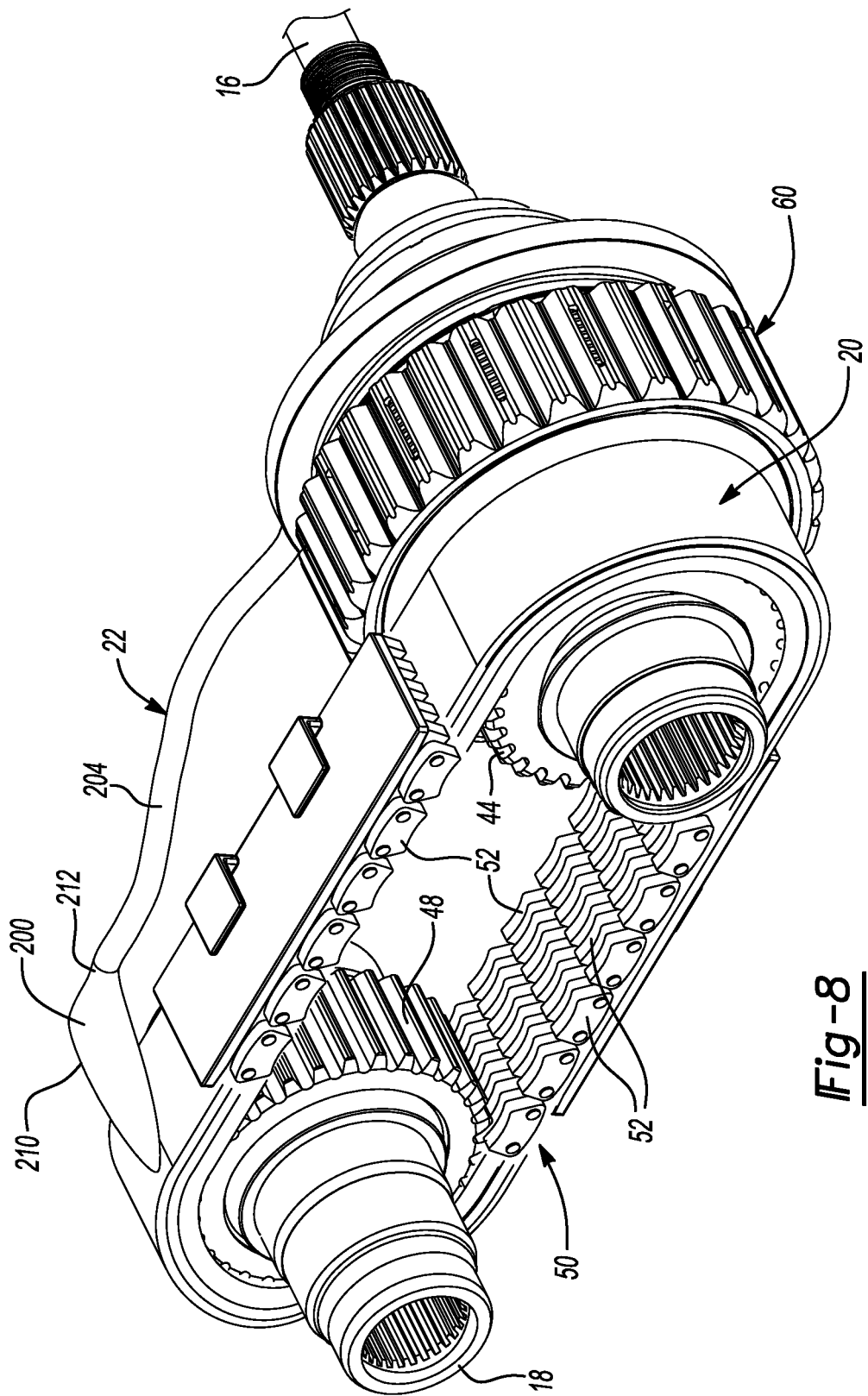
FIG. 8 is a front perspective view of the portion of the transfer case shown in FIG. 4.

With reference to FIGS. 1, 4 and 8, when the transfer case 10 is operated in a desired mode, such as a four-wheel drive mode, so that rotary power is transmitted between the first and second output shafts 16 and 18, and the second output shaft 18 is rotating in a predetermined rotational direction at a rotational speed in excess of a predetermined speed, a portion of the drive assembly 20 can pass or rotate through a lubricant (e.g., oil, automatic transmission fluid) in the sump 32. For example, the chain 50 and optionally a portion of the second sprocket 48 can travel through the lubricant in the sump 32 during operation of the transfer case 10 so that a portion of the lubricant in the sump 32 can cling to links 52 of the chain 50 as they exit the sump 32 and approach the inlet 200 of the lubrication guide 22. Moreover, shear forces acting on the lubricant in the sump 32 can create a wave or surge of lubricant that can follow the links 52 of the chain 50 as they rotate around the second sprocket 48. The inlet 200 of the lubrication guide 22 is positioned to receive splash lubrication from the chain 50. In this regard, the inlet 200 can be positioned to receive lubricant that has clung to the chain 50 as it passes through the lubricant in the sump 32 and is thrown from the links 52 of the chain 50 due to centrifugal force. It will be appreciated that slung lubrication not only includes lubricant that is directly slung into the inlet 200 from a moving component (i.e., the chain 50 in this example), but also lubricant that is slung onto another structure, such as the housing 12, and thereafter drains into the inlet 200. Additionally or alternatively, the inlet 200 can be positioned to receive lubricant from a lubricant surge created by shear forces acting on the lubricant in the sump 32 as the links 52 of the chain 50 pass through and out of the lubricant in the sump 32. Lubricant received into the inlet 200 can be directed by the inlet 200 into the elongated tubular section 204 and transmitted to the outlet 202.

With reference to FIG. 3, lubricant in the lubrication guide 22 is discharged from the outlet 202 into the lubrication intake 220 in the non-rotatable ball-ramp ring 132, through a hole 250 in the sleeve 130 and onto a helically-grooved portion 252 of the first output shaft 16 that can be configured to transport lubricant to at least one of the clutch 60 and the clutch actuator 120. The helically-grooved portion 252 of the first output shaft 16 can be formed similar to shallow, relatively coarse threads and can function to some degree as an Archimedes' screw to transport/translate the lubrication discharged through the hole 250 in the sleeve 130 toward an opposite axial end 256 of the helically-grooved portion 252 of the first output shaft 16. In the example provided, the opposite axial end 256 of the helically-grooved portion 252 extends beyond the sleeve 130 and into annular chamber 86 of the clutch hub 64. The external snap ring 94 can intersect the grooves in the helically-grooved portion 252 and as such, lubricant that is driven against the external snap ring 94, which can aid in directing the lubricant radially outwardly between a gap 260 between the internally splined hub portion 76 of the clutch hub 64 and the sleeve 130 and into the annular chamber 86 between the internally splined hub portion 76 and the plate mount 78. If desired, an oil spout 264, such as the one described in co-pending, commonly assigned U.S. application Ser. No. 15/904,685 (Power Transmitting Component Having An Oil Spout For Guiding Lubrication), the disclosure of which is incorporated by reference as if set forth in detail herein, can be employed to direct lubricant received in the annular chamber 86 to a desired location. Lubrication received in the annular chamber 86 can be dispensed through the lubrication apertures 88 in the plate mount 78 to lubricate the first and second clutch plates 110 and 112 of the clutch pack 68.

Additionally or alternatively, a lubrication port 270 can be formed through the sleeve 130 and can be configured to discharge lubrication from the helically-grooved portion 252 to the clutch actuator 120. In the example provided, the lubrication port 270 is formed through the sleeve 130 at a location where lubrication discharged from the lubrication port 270 lubricates the second thrust bearing 142.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A transfer case comprising:
a housing defining an internal cavity;
a first output shaft received in the internal cavity and supported by the housing for rotation about a primary axis;
a second output shaft received in the internal cavity and supported by the housing for rotation about a secondary axis;
a drive assembly transmitting rotary power between the first and second output shafts; and
a lubrication guide disposed in the internal cavity and having an inlet, an outlet and an elongated tubular section disposed between the inlet and the outlet, the lubrication guide being coupled to the drive assembly such that the inlet is disposed proximate a first rotary component of the drive assembly to receive splash lubrication therefrom when rotary power is transmitted between the first and second output shafts to drive the second output shaft in a predetermined rotational direction and at a speed in excess of a predetermined rotational speed;
wherein the inlet is disposed closer to the second output shaft than the outlet; and
wherein when the transfer case is disposed in a baseline operating position, the outlet is vertically below the inlet.

2. The transfer case of claim 1, wherein the inlet has a first end, which is open, and a second end that is attached to the elongated tubular section, and wherein the inlet converges between the first end and the second end.

3. The transfer case of claim 2, wherein the drive assembly comprises a first sprocket, which is driven by the first output shaft, a second sprocket, which is coupled to the second output shaft for rotation therewith, and a chain that is engaged to the first and second sprockets.

4. The transfer case of claim 3, wherein the first rotary component is the second sprocket.

5. The transfer case of claim 3, wherein the drive assembly further comprises a clutch for selectively transmitting rotary power between the first output shaft and the first sprocket.

6. The transfer case of claim 5, wherein the clutch is a friction clutch.

7. The transfer case of claim 1, wherein the first output shaft has a helically grooved portion and wherein the outlet is in fluid communication with the helically grooved portion.

8. The transfer case of claim 7, wherein the drive assembly further comprises a clutch and a clutch actuator, and wherein the helically grooved portion of the first output shaft is configured to transport lubrication to the clutch and the clutch actuator.

9. The transfer case of claim 8, wherein the clutch actuator comprises a rotatable ball-ramp ring, a non-rotatable ball-ramp ring and a plurality of balls between the rotatable and non-rotatable ball-ramp rings, and wherein the non-rotatable ball-ramp ring defines a fluid port that extends between the outlet and the helically grooved portion of the first output shaft.

10. A transfer case comprising:
a housing defining an internal cavity;
a shaft disposed in the internal cavity and supported by the housing for rotation about a primary axis;
a clutch received in the housing and having a clutch hub, which is coupled to the shaft for rotation therewith, a clutch basket, a plurality of first clutch plates, a plurality of second clutch plates, and a pressure plate, the first clutch plates being axially slidably but non-rotatably mounted to the clutch hub, the second clutch plates being axially slidably but non-rotatably mounted to the clutch basket, the pressure plate being non-rotatably but axially slidably mounted to one of the clutch hub and the clutch basket;
a clutch actuator having a rotatable ball-ramp ring that is disposed about the shaft, a non-rotatable ball-ramp ring that is disposed about the shaft, and a plurality of balls between the rotatable and non-rotatable ball-ramp rings; and
a lubrication guide disposed in the internal cavity and mounted to the non-rotatable ball-ramp ring, the lubrication guide having an inlet, an outlet and an elongated tubular section disposed between the inlet and the outlet, the lubrication guide being oriented such that the inlet is positioned to receive splash lubrication when rotary power is transmitted through the clutch in a predetermined rotational direction and at a speed in excess of a predetermined rotational speed;
wherein the shaft has a helically grooved portion and wherein the outlet is in fluid communication with the helically grooved portion.

11. The transfer case of claim 10, wherein the helically grooved portion of the shaft is configured to transport lubrication to at least one of the clutch and the clutch actuator.

12. The transfer case of claim 11, wherein the clutch actuator further comprises an apply plate, which abuts the pressure plate, a thrust bearing, which is disposed between the apply plate and the rotatable ball-ramp ring, and a sleeve that is non-rotatably coupled to the non-rotatable ball-ramp ring.

13. The transfer case of claim 12, wherein the sleeve defines a lubrication port that receives a portion of the lubrication that is transported by the helically grooved portion of the shaft, wherein the portion of the lubrication transmitted through the lubrication port lubricates the thrust bearing.

14. The transfer case of claim 12, wherein the sleeve extends into an annular chamber in the clutch hub, wherein a plurality of lubrication apertures extend radially outwardly from the annular chamber and through a splined surface onto which the first clutch plates are mounted, and wherein lubrication discharged from the helically grooved portion of the shaft into the clutch hub is transmitted through the lubrication apertures to the first and second clutch plates.

15. The transfer case of claim 10, wherein the inlet has a first end, which is open, and a second end that is attached to the elongated tubular section, and wherein the inlet converges between the first end and the second end.

* * * * *